United States Patent

Nipper

Patent Number: 5,921,304
Date of Patent: Jul. 13, 1999

[54] TIRE RIM HOLDER

[76] Inventor: Thomas C. Nipper, 20 Butler Bridge Rd., Covington, Ga. 30016

[21] Appl. No.: 08/871,828

[22] Filed: Jun. 9, 1997

[51] Int. Cl.⁶ ..................................................... B60B 30/06
[52] U.S. Cl. ............................................... 157/16; 157/21
[58] Field of Search ................................. 157/14, 16, 17, 157/21; 269/47, 50, 51, 52, 77

[56] References Cited

U.S. PATENT DOCUMENTS

| | | | |
|---|---|---|---|
| 2,873,777 | 2/1959 | Thostenson | 157/16 |
| 3,916,971 | 11/1975 | Carpenter et al. | 157/21 |
| 3,923,090 | 12/1975 | Kinney | 157/17 |
| 4,478,081 | 10/1984 | Greene | 157/21 |
| 5,332,020 | 7/1994 | Brunner | 157/14 |

Primary Examiner—David A. Scherbel
Assistant Examiner—Joni B. Danganan
Attorney, Agent, or Firm—Patrick F. Henry

[57] ABSTRACT

A selective optional lug adapter is to be mounted on a securing rod assembly that is held in place by a pair of clamping plates which are selectively bolted in place on a pivot tube supported on a base so that a small wheel rim can be held stationary while the tire or the rim is changed (i.e. removed and replaced) in a matter of minutes. Furthermore, the entire device can be disassembled into its major parts for storage, and adapters for different openings in the small rim can be changed or omitted.

5 Claims, 3 Drawing Sheets

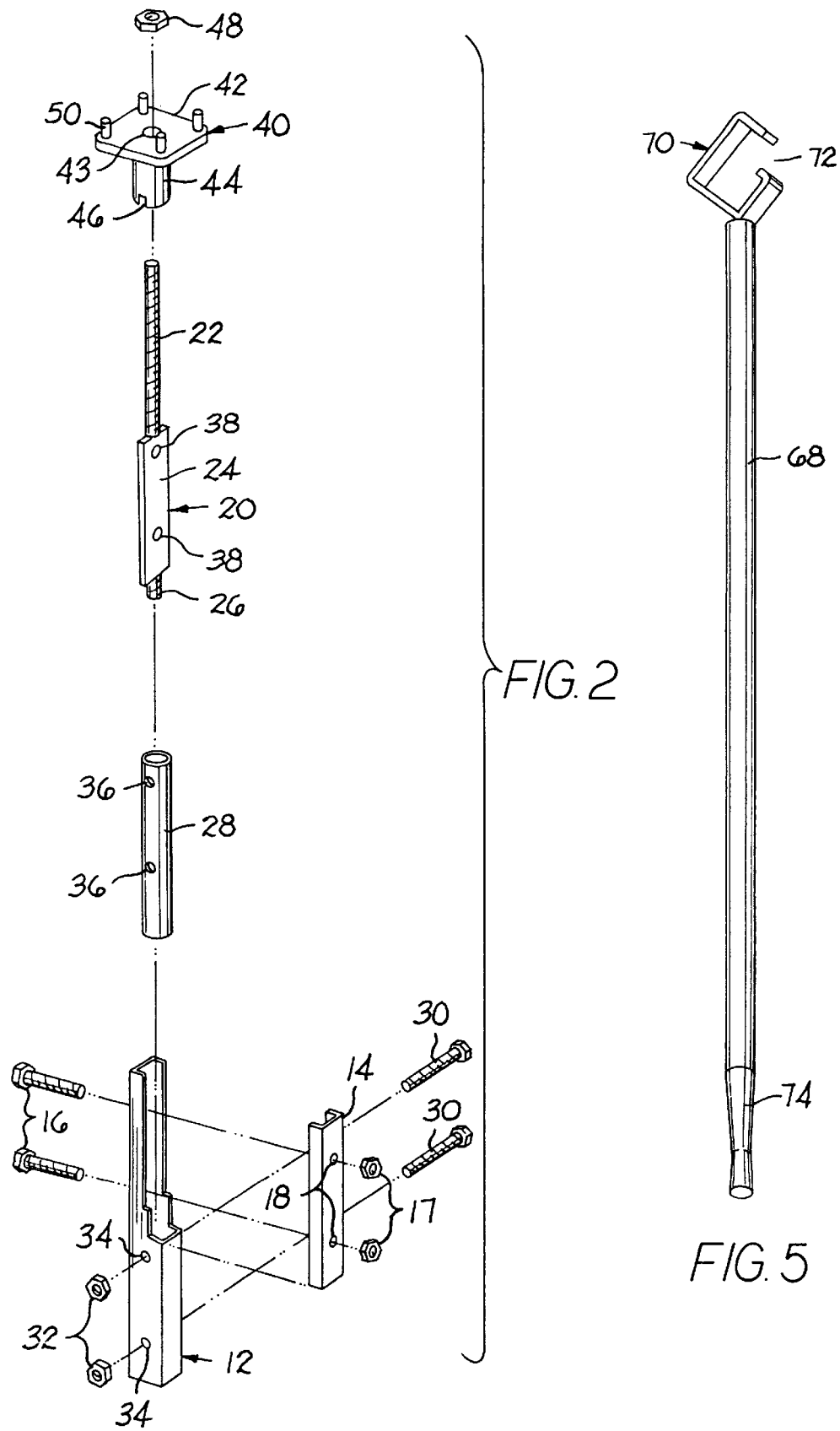

TIRE RIM HOLDER

FIELD OF THE INVENTION

Devices for holding and supporting from rotation a small tire rim while mounting or removing a vehicle tire from the rim.

BACKGROUND OF THE INVENTION

A significant problem in the removal and replacement of a tire from a small rim is holding and supporting from rotation the rim while the tire is being removed by means of tools such as bead breaker and other tire removal tools. There are many tire removal devices intended for large automobile and truck tires, but such devices do not lend themselves to the removal of smaller tires (i.e. for boat trailers) from rims in a simple and expedient way. Some four inch rims have a hub made into the rim while other size rims have lug holes such as three hole, four hole, and five hole and it is important that the rim holder accommodate different small sizes in a simple and fast manner. For example, U.S. Pat. No. 3,867,975 discloses a tire changing device for small wheels such as those found on boat trailers and the like whereas U.S. Pat. No. 1,975,148 discloses a tire changing stand which can be mounted directly on a workbench and includes a hub clamp and lug holding means. Also, U.S. Pat. Nos. 3,050,110; 3,074,468; and 5,232,035 disclose the changing devices. None of these prior patents disclose the particular arrangement which is presented in the present disclosure. One difference is that the holding and clamping mechanism in the present device is different from the ones shown in the prior patents. Therefore, a primary object of the present invention is to provide a mechanical device for holding and supporting a small rim from rotation while removing and replacing a small tire from said rim so that the removal and replacement can be effectively and safely accomplished in a brief period of time. It is also important that the device be made and sold at a very economical price and easily stored so that virtually any boat owner could afford to own one for use on the trailer wheels. Accordingly, a boat owner can have such a device available at all times while pulling the boat on trailer.

SUMMARY OF THE INVENTION

The present invention comprises a selective optional lug adapter which can be mounted on a securing rod assembly that is held in place by a pair of clamping plates which are bolted in place on a pivot tube so that a wheel rim can be held stationary whereby the tire on the rim can be changed (i.e. removal and replacement) in a matter of minutes. Furthermore, the entire device can be disassembled into its major parts for storage, and adapters for different openings in the rim can be changed or omitted for certain wheels (e.g. four inch).

Other and further objects and advantages of the present invention will appear from a reading of the following description taken in conjunction with the drawings.

BRIEF DESCRIPTION OF THE DRAWINGS

FIG. 2 is a perspective view of the device shown in FIG. 1 disassembled for subsequent assembly.

FIG. 5 is a perspective view or the tire tool which can be used in conjunction with the prevent device.

Other and further objects and advantages of the present invention will become apparent upon reading the following description:

DESCRIPTION OF A PREFERRED EMBODIMENT

Figure 1:
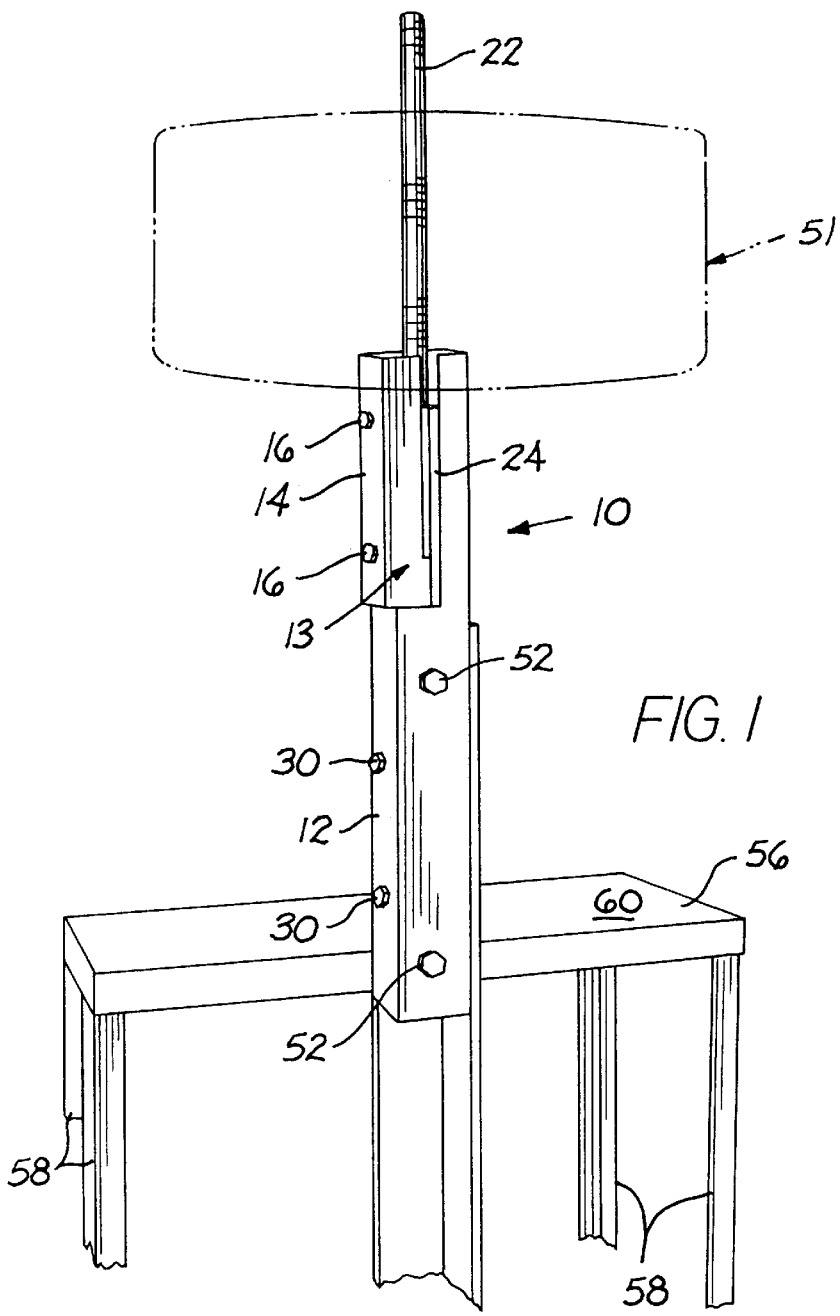
FIG. 1 is a perspective view of the present device with a wheel in place as shown in phantom lines.

Referring initially to FIG. 1 and then to other FIGS. of the drawings, the assembled device 10 comprises a clamp base 12 which may be in a metal tube box formation made from a steel member having a clamp 13 with removable clamping plate 14 which is assembled or disassembled by means of securing bolts 16 positioned in respective bolt holes 18 so as to secure the clamping plate 14 into position onto clamp base 12 thereby providing an adjustable clamp 13 for securing and adjusting a securing rod assembly 20 comprising a threaded rod 22 having a flat plate 24 attached thereto. Bolts pass through bolt holes 34. Plate 24 has holes 38 which match and align with bolts 16. Plate 24 has threaded shaft or rod 22 attached thereto. A 4-lug adapter 40 (FIG. 2) comprises a plate 42 with hole 43 and a bottom tube or hub 44 which is assembled with a notch 46 fitted over the end of plate 24 to prevent rotation of adapter 40. A nut 48 fits the upper threaded end of rod 22 and with the notch 46 on the plate 24 prevents the threaded rod 22 from rotating. Plate 42 is provided with 4 lugs 50 which fit into the lug holes on a wheel rim and prevent a wheel 51 (FIG. 1) from turning. Clamp base 12 optionally may be attached by bolts 52 to a stand 56 having legs 58 attached to a platform 60 to provide a workstation for various tools such as a bead breaker.

Figure 6:
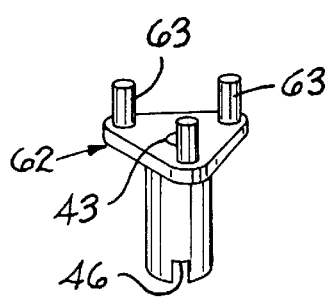
FIG. 6 is a perspective views of a three lug adapter for use with wheel rims having three lug holes.
Figure 7:
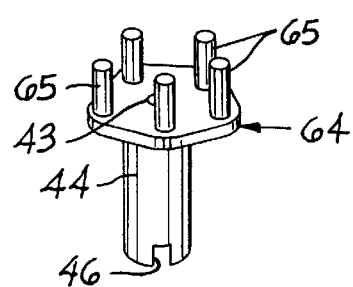
FIG. 7 is a perspective view of a five lug adapter for use with a wheel rim having five lug holes.
Figure 3:
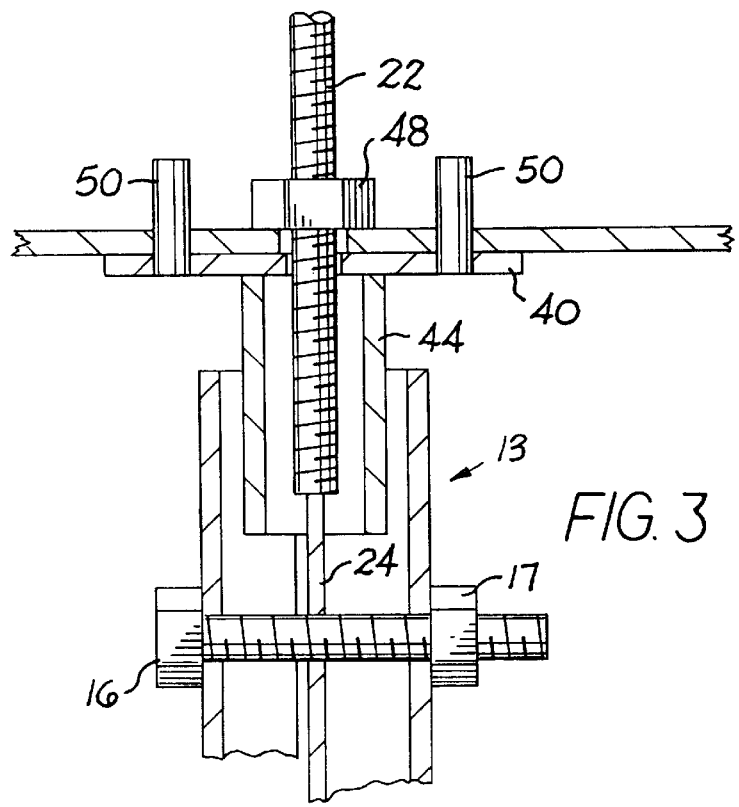
FIG. 3 is a medial cross-sectional view taken on FIG. 1 through the wheel clamp and wheel plate with adapter.
Figure 4:
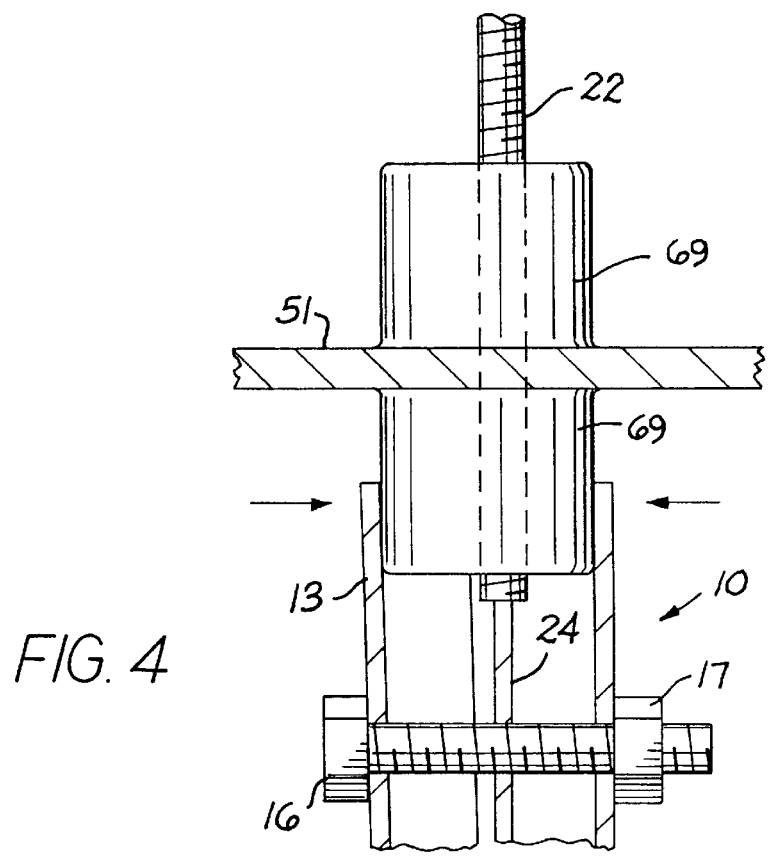
FIG. 4 is a cross sectional view taken on FIG. 1 through a wheel hub clamped in pace without adapter plate.

The adapter 40 may be replaced simply and easily by substituting a three lug adapter 62 having pins 63 shown in FIG. 6 or a five lug adapter 64 having pins 65 shown in FIG. 7 or any suitable replacement adapter or no adapter wheel for a particular wheel rim 51. In FIG. 4, the operation of the device 10 for a four inch rim or other rims 51 which have a hub 69 made into the rim, the rim is placed over the securing rod 20 so tart the hub 69 of the rim 51 fits into the clamp 13. The clamp bolts 16 are tightened to clamp in the direction of the arrows in FIG. 4 and so is the nut 48 to clamp the rim 51 securely while a tire tool is inserted to break the beam and remove the old tire and to put a new tire back on the rim. Then the clamp bolts 16 are loosened and nut 48 removed from the securing rod 22 to remove the rim from the device 10. In the case of three lug (FIG. 6), four lug, and five (FIG. 7) lug rims the appropriate adapter 62 or 64 et al are spaced on the securing rod assembly 20 so that the lug hub goes into the clamp 13 whereby the steps previously set forth in connection with a four inch rim are repeated.

In order to facilitate the removal of the tire including the breaking of the tire bead from the rim and removal of the tire there is provided a tire tool shown in FIG. 5 comprising a steel shaft 68 on which is mounted an open box 70 having an opening 72 on one end of the shaft 70 and the other end of which is provided with a tapered portion 74 which can be inserted between the bead of the tire and the rim for the purpose of breaking the bead and removing the tire bead with tire from the rim.

While there is shown a preferred embodiment of the device 10 the invention is not limited thereby since alterations, deviations, changes and revisions may be made in the preferred embodiment without departing from the scope of the invention as defined only by proper interpretation of the claims.

I claim:

1. A device for supporting a small wheel rim for the purpose of removing and replacing a tire having a tire bead on the rim comprised of:

a clamp base for supporting a tire on a rim;

a movable clamp plate attached to said clamp base for selectively clamping a wheel rim;

a wheel rim securing rod assembly attached to said clamp base, said assembly comprising:
   a securing rod, and
   a securing plate mounted on said rod and attached to said clamp base; and a removable adapter engageable with said rod assembly.

2. The device in claim 1, wherein at least a portion of said rod being threaded.

3. The device in claim 1 wherein said securing plate is selectively engageable with said adapter to prevent rotation of a rim.

4. The device of claim 1, further including projecting wheel rim members on a lug plate of said adapter, said wheel rim members positionable in holes in said wheel rim.

5. The device of claim 4, wherein said adapter has a notch for engaging said securing plate therein.

* * * * *